US009308616B2

(12) United States Patent
Bliss

(10) Patent No.: US 9,308,616 B2
(45) Date of Patent: Apr. 12, 2016

(54) REFURBISHED COMPONENT, ELECTRONIC DEVICE INCLUDING THE SAME, AND METHOD OF REFURBISHING A COMPONENT OF AN ELECTRONIC DEVICE

(71) Applicant: Innovative Finishes LLC, Bloomfield, CT (US)

(72) Inventor: Jeffrey J. Bliss, Granby, CT (US)

(73) Assignee: INNOVATIVE FINISHES LLC, Bloomfield, CT (US)

( * ) Notice: Subject to any disclaimer, the term of this patent is extended or adjusted under 35 U.S.C. 154(b) by 0 days.

(21) Appl. No.: 14/157,642

(22) Filed: Jan. 17, 2014

(65) Prior Publication Data
US 2014/0206795 A1    Jul. 24, 2014

Related U.S. Application Data

(60) Provisional application No. 61/754,826, filed on Jan. 21, 2013, provisional application No. 61/777,075, filed on Mar. 12, 2013.

(51) Int. Cl.
| | |
|---|---|
| *B05D 3/12* | (2006.01) |
| *B05D 3/00* | (2006.01) |
| *B24B 7/24* | (2006.01) |
| *B24B 13/015* | (2006.01) |
| *B24B 29/02* | (2006.01) |
| *B24B 37/04* | (2012.01) |
| *C09G 1/02* | (2006.01) |
| *B24C 1/08* | (2006.01) |

(52) U.S. Cl.
CPC ............... *B24B 7/242* (2013.01); *B24B 13/015* (2013.01); *B24B 29/02* (2013.01); *B24B 37/044* (2013.01); *B24C 1/086* (2013.01); *C09G 1/02* (2013.01)

(58) Field of Classification Search
CPC .................................. B05D 5/005; C03C 17/10
USPC .................................. 427/165, 168, 140, 407.2
See application file for complete search history.

(56) References Cited

U.S. PATENT DOCUMENTS

| | | | |
|---|---|---|---|
| 4,330,572 A | 5/1982 | Holt et al. | |
| 4,535,576 A * | 8/1985 | Shukla et al. | 451/78 |
| 5,063,102 A | 11/1991 | Lee et al. | |
| 5,303,132 A * | 4/1994 | Lowder | 362/138 |
| 5,356,622 A | 10/1994 | Early et al. | |
| 5,356,662 A | 10/1994 | Early et al. | |
| 5,466,727 A | 11/1995 | Hsieh | |
| 5,663,247 A | 9/1997 | Sorensen et al. | |
| 6,103,848 A | 8/2000 | Decker et al. | |
| 6,106,654 A | 8/2000 | Velin et al. | |
| 6,114,489 A | 9/2000 | Vicari et al. | |
| 6,306,508 B1 | 10/2001 | Black et al. | |
| 6,482,488 B1 * | 11/2002 | Janssen et al. | 428/40.1 |
| 6,639,178 B2 | 10/2003 | Kupisiewicz | |
| 6,682,872 B2 | 1/2004 | Sachdev et al. | |
| 6,712,901 B2 | 3/2004 | Tsujimoto et al. | |
| 6,753,386 B1 | 6/2004 | Yahkind et al. | |
| 6,807,824 B1 | 10/2004 | Miwa | |
| 6,866,764 B2 | 3/2005 | Dalman et al. | |
| 7,091,308 B2 | 8/2006 | Haggman et al. | |
| 7,186,711 B2 | 3/2007 | Haggman et al. | |
| 7,186,771 B2 | 3/2007 | Haggman et al. | |
| 7,211,290 B2 | 5/2007 | Joret et al. | |
| 7,385,007 B2 | 6/2008 | Moroishi et al. | |
| 7,666,511 B2 | 2/2010 | Ellison et al. | |
| 8,007,913 B2 | 8/2011 | Coppola et al. | |
| 8,075,999 B2 | 12/2011 | Barefoot et al. | |
| 8,115,326 B2 | 2/2012 | Aitken et al. | |
| 8,187,987 B2 | 5/2012 | Amin et al. | |
| 8,206,827 B2 | 6/2012 | Choate | |
| 8,211,505 B2 | 7/2012 | Bocko et al. | |
| 8,232,218 B2 | 7/2012 | Dejneka et al. | |
| 8,293,322 B2 | 10/2012 | Burghardt et al. | |
| 8,303,754 B2 | 11/2012 | Higuchi | |
| 8,304,078 B2 | 11/2012 | Varshneya | |
| 8,309,632 B2 | 11/2012 | Su et al. | |

(Continued)

FOREIGN PATENT DOCUMENTS

| | | |
|---|---|---|
| CA | 1011010 | 5/1977 |
| CA | 1143497 A | 3/1983 |

(Continued)

OTHER PUBLICATIONS

International Search Report; International Application No. PCT/US2014/011949; Date of Filing: Jan. 17, 2014; Date of Mailing: Apr. 18, 2014; 6 pgs.

Written Opinion of the International Searching Authority; International Application No. PCT/US2014/011949; Date of Filing: Jan. 17, 2014; Date of Mailing: Apr. 18, 2014; 9 pgs.

International Search Report for International Application No. PCT/US2014/034991, international filing date of Apr. 22, 2014, mailed Aug. 28, 2014, 8 pages.

(Continued)

*Primary Examiner* — Dah-Wei D Yuan
*Assistant Examiner* — Nga Leung V Law
(74) *Attorney, Agent, or Firm* — Cantor Colburn LLP

(57) ABSTRACT

A method of refurbishing a surface of a component for an electronic device includes: abrading a surface to be refurbished with an abrasive to remove a coating on the surface and provide an abraded surface; optionally firstly cleaning the abraded surface by contacting with a glass cleaner to provide a firstly cleaned surface; optionally secondly cleaning the firstly cleaned surface by contacting the firstly cleaned surface with a grease remover to provide a secondly cleaned surface; optionally contacting the secondly cleaned surface with an activator to provide an activated surface; and disposing a coating resin on the abraded and optionally activated surface; and curing the coating resin to provide a coated surface to refurbish the surface of the electronic device.

18 Claims, No Drawings

(56) References Cited

U.S. PATENT DOCUMENTS

| | | |
|---|---|---|
| 8,312,739 B2 | 11/2012 | Lee et al. |
| 8,318,244 B2 | 11/2012 | Brasseur et al. |
| 8,329,248 B2 | 12/2012 | Jackson et al. |
| 8,349,454 B2 | 1/2013 | Murata et al. |
| 8,363,189 B2 | 1/2013 | Sampica et al. |
| 8,367,208 B2 | 2/2013 | Glaesemann et al. |
| 8,367,209 B2 | 2/2013 | Zhang et al. |
| 8,389,074 B2 | 3/2013 | Jones et al. |
| 8,404,563 B2 | 3/2013 | Hanaoka |
| 8,557,890 B2 | 10/2013 | Chang et al. |
| 2002/0071957 A1* | 6/2002 | Squitieri ............... 428/442 |
| 2003/0045653 A1 | 3/2003 | Flosbach et al. |
| 2003/0146485 A1 | 8/2003 | Ezaki |
| 2004/0055994 A1 | 3/2004 | Miwa |
| 2004/0157758 A1 | 8/2004 | Adickes et al. |
| 2004/0225057 A1 | 11/2004 | Anderson et al. |
| 2005/0142362 A1 | 6/2005 | Inaoka et al. |
| 2005/0229816 A1 | 10/2005 | Krienke et al. |
| 2006/0096614 A1 | 5/2006 | Krisko |
| 2008/0014368 A1 | 1/2008 | Feyrer et al. |
| 2008/0226829 A1 | 9/2008 | Choate |
| 2009/0081373 A1* | 3/2009 | Choate ............... 427/385.5 |
| 2009/0173253 A1 | 7/2009 | Roesch et al. |
| 2010/0210745 A1 | 8/2010 | McDaniel et al. |
| 2011/0159278 A1 | 6/2011 | Lee et al. |
| 2011/0220266 A1 | 9/2011 | Aravamudan |
| 2011/0230584 A1 | 9/2011 | Araki et al. |
| 2011/0312483 A1 | 12/2011 | Nakashima et al. |
| 2012/0003384 A1 | 1/2012 | Janssen et al. |
| 2012/0077041 A1 | 3/2012 | Yamane et al. |
| 2012/0115976 A1 | 5/2012 | Igarashi et al. |
| 2012/0147538 A1 | 6/2012 | Kawanami et al. |
| 2012/0165465 A1 | 6/2012 | Kim et al. |
| 2012/0171454 A1 | 7/2012 | Kondo |
| 2012/0183756 A1 | 7/2012 | Higuchi |
| 2012/0194974 A1 | 8/2012 | Weber et al. |
| 2012/0219792 A1 | 8/2012 | Yamamoto et al. |
| 2012/0256354 A1 | 10/2012 | Desimone et al. |
| 2012/0264585 A1 | 10/2012 | Ohara et al. |
| 2012/0270057 A1 | 10/2012 | Yamane et al. |
| 2012/0313877 A1 | 12/2012 | Han |
| 2012/0321898 A1 | 12/2012 | Meinhardt et al. |
| 2012/0327568 A1 | 12/2012 | Shedletsky et al. |
| 2013/0011650 A1 | 1/2013 | Akiba et al. |
| 2013/0011683 A1 | 1/2013 | Busman et al. |
| 2013/0017380 A1 | 1/2013 | Murata et al. |
| 2013/0045386 A1 | 2/2013 | Murata |
| 2013/0109116 A1 | 5/2013 | Cavuoti et al. |
| 2013/0136582 A1 | 5/2013 | Mizokami et al. |
| 2013/0155004 A1 | 6/2013 | Yoshikawa |
| 2013/0269392 A1 | 10/2013 | Ono et al. |
| 2013/0288001 A1 | 10/2013 | Murata et al. |
| 2014/0017500 A1 | 1/2014 | Koike et al. |
| 2014/0206795 A1 | 7/2014 | Bliss |

FOREIGN PATENT DOCUMENTS

| | | |
|---|---|---|
| CN | 101941316 A | 1/2011 |
| CN | 102004594 A | 4/2011 |
| CN | 201904982 U | 7/2011 |
| CN | 102632026 A | 8/2012 |
| CN | 101463234 B | 10/2012 |
| CN | 102775050 A | 11/2012 |
| EP | 0621327 A1 | 10/1994 |
| EP | 1304399 A1 | 4/2003 |
| EP | 0832947 B1 | 5/2003 |
| EP | 1404902 B1 | 3/2013 |
| GB | 1421681 A | 1/1976 |
| JP | H07141107 A | 6/1995 |
| JP | 2001294709 A | 10/2001 |
| JP | 2003095702 A | 4/2003 |
| JP | 2005077844 A | 3/2005 |
| JP | 2006114719 A | 4/2006 |
| JP | 2008117415 A | 5/2008 |
| JP | 2008241804 A | 10/2008 |
| JP | 2010222495 A | 10/2010 |
| JP | 2010280832 A | 12/2010 |
| JP | 4745215 B2 | 8/2011 |
| JP | 2012046654 A | 3/2012 |
| JP | 2012096950 A | 5/2012 |
| JP | 2012121985 A | 6/2012 |
| JP | 2012128157 A | 7/2012 |
| JP | 2012153571 A | 8/2012 |
| JP | 2012164577 A | 8/2012 |
| JP | 2012176495 A | 9/2012 |
| JP | 2012196868 A | 10/2012 |
| JP | 05070259 B2 | 11/2012 |
| JP | 2012218995 A | 11/2012 |
| JP | 2012255172 A | 12/2012 |
| KR | 20030080183 A | 10/2003 |
| KR | 20050066745 A | 6/2005 |
| KR | 100691858 B1 | 2/2007 |
| KR | 20090123234 A | 12/2009 |
| KR | 20110137959 A | 12/2011 |
| KR | 20120127197 A | 11/2012 |
| KR | 20120130695 A | 12/2012 |
| KR | 101290717 B1 | 7/2013 |
| TW | 201235211 A | 9/2012 |
| WO | 9813008 A1 | 4/1998 |
| WO | 0179370 A1 | 10/2001 |
| WO | 2004041874 A1 | 5/2004 |
| WO | 2004110926 A1 | 12/2004 |
| WO | 2008047562 A1 | 4/2008 |
| WO | 2009099615 A1 | 8/2009 |
| WO | 2010005578 A1 | 1/2010 |
| WO | 2010006073 A2 | 1/2010 |
| WO | 2011022639 A2 | 2/2011 |
| WO | 2011022661 A2 | 2/2011 |
| WO | 2011085190 A1 | 7/2011 |
| WO | 2011100277 A1 | 8/2011 |
| WO | 2011144024 A1 | 11/2011 |
| WO | 2012027660 A1 | 3/2012 |
| WO | 2012061240 A1 | 5/2012 |
| WO | 2012074949 A1 | 6/2012 |
| WO | 2012074953 A1 | 6/2012 |
| WO | 2012074954 A1 | 6/2012 |
| WO | 2012074983 A1 | 6/2012 |
| WO | 2012082528 A2 | 6/2012 |
| WO | 2012099002 A1 | 7/2012 |
| WO | 2012106280 A1 | 8/2012 |
| WO | 2012121116 A1 | 9/2012 |
| WO | 2012126394 A1 | 9/2012 |
| WO | 2012151459 A1 | 11/2012 |
| WO | 2012154516 A1 | 11/2012 |
| WO | 2012166343 A2 | 12/2012 |
| WO | 2012166421 A1 | 12/2012 |
| WO | 2013006301 A1 | 1/2013 |
| WO | 2013006750 A2 | 1/2013 |
| WO | 2013009055 A9 | 1/2013 |
| WO | 2013012394 A1 | 1/2013 |
| WO | 2013016157 A1 | 1/2013 |
| WO | 2013021975 A1 | 2/2013 |
| WO | 2013027675 A1 | 2/2013 |
| WO | 2013028133 A1 | 2/2013 |
| WO | 2013028135 A1 | 2/2013 |
| WO | 2013028492 A1 | 2/2013 |
| WO | 2013032421 A1 | 3/2013 |

OTHER PUBLICATIONS

International Search Report for International Application No. PCT/US2014/034993, international filing date of Apr. 22, 2014, mailed Aug. 29, 2014, 17 pages.

Material Data Safety Sheet, "Armour Etch Glass Etchant", Jan. 1, 2008, 5 pages.

Material Data Safety Sheet, "LOW VOC HARDENER", May 17, 2011, Version 10, 8 pages.

(56) References Cited

OTHER PUBLICATIONS

Written Opinion for International Application No. PCT/US2014/034991, international filing date of Apr. 22, 2014, mailed Aug. 28, 2014, 9 pages.

Written Opinion for International Application No. PCT/US2014/034993, international filing date of Apr. 22, 2014, mailed Aug. 29, 2014, 9 pages.

* cited by examiner

REFURBISHED COMPONENT, ELECTRONIC DEVICE INCLUDING THE SAME, AND METHOD OF REFURBISHING A COMPONENT OF AN ELECTRONIC DEVICE

CROSS REFERENCE TO RELATED APPLICATION

This application claims priority to U.S. Provisional Application Ser. No. 61/754,826, filed on Jan. 21, 2013,and U.S. Provisional Application Ser. No. 61/777,075,filed on Mar. 12, 2013,the contents of both of which are incorporated herein by reference in their entirety.

BACKGROUND (1) Field

This disclosure relates to a refurbished component, an electronic device including the same, and method of refurbishing a component of an electronic device.

(2) Description of the Related Art

Electronic devices, such as cell phones or touch pads, can get scratched or worn in the course of use. Devices without visible scratches are desirable because they have higher resale value and are cosmetically attractive. Scratched or worn components can be replaced with new components. However, refurbishing is desirable to reduce cost and environmental impact. Thus there remains a need for a method of refurbishing device components to provide a suitable surface finish, including a desirable cosmetic appearance.

SUMMARY

Disclosed is a method of refurbishing a surface of a component for an electronic device, the method including: abrading a surface to be refurbished with an abrasive to remove a coating on the surface and provide an abraded surface; optionally firstly cleaning the abraded surface by contacting with a glass cleaner to provide a firstly cleaned surface; optionally secondly cleaning the firstly cleaned surface by contacting the firstly cleaned surface with a grease remover to provide a secondly cleaned surface; optionally contacting the secondly cleaned surface with an activator to provide an activated surface; and disposing a coating resin on the abraded and optionally activated surface; and curing the coating resin to provide a coated surface to refurbish the surface of the electronic device, wherein the coating resin includes: a hydroxyl functional dendritic polymer; optionally an acrylic polyol; and a plurality of metal oxide nanoparticles optionally encapsulated in a hydroxyl functional polymer or a hydroxyl functional fluorosurfactant.

Also disclosed is a method of refurbishing a surface, the method including: abrading a surface to be refurbished with an abrasive to remove a coating on the surface and provide an abraded surface; optionally firstly cleaning the abraded surface by contacting with a glass cleaner to provide a firstly cleaned surface; optionally secondly cleaning the firstly cleaned surface by contacting the firstly cleaned surface with a grease remover to provide a secondly cleaned surface; optionally contacting the secondly cleaned surface with an activator to provide an activated surface; and disposing a coating resin on the abraded and optionally activated surface; and curing the coating resin to provide a coated surface to refurbish the surface. wherein the coating resin includes: a hydroxyl functional dendritic polymer; optionally an acrylic polyol; and a plurality of metal oxide nanoparticles optionally encapsulated in a hydroxyl functional polymer or a hydroxyl functional fluorosurfactant.

Also disclosed is a method of refurbishing a surface of a component for an electronic device, the method including: abrading a surface to be refurbished with an abrasive to remove a coating on the surface and provide an abraded surface; optionally firstly cleaning the abraded surface by contacting with a glass cleaner to provide a firstly cleaned surface; optionally secondly cleaning the firstly cleaned surface by contacting the firstly cleaned surface with a grease remover to provide a secondly cleaned surface; contacting the secondly cleaned surface with an activator to provide an activated surface; and disposing a coating resin on the abraded and activated surface; and curing the coating resin to provide a coated surface to refurbish the surface of the electronic device, wherein the coating resin includes a first resin and a second resin, the first resin includes a clear coat, a hardener, and a reducer, wherein the clear coat includes a hydroxyl-functional binder comprising a polyurethane, a (meth)acrylic copolymer, a polyester, a polyether, or a combination thereof; the hardener includes a polyisocyanate crosslinker; and the reducer includes a solvent; and the second resin comprises a first component and a second component, wherein the first component includes: hydroxyl functional dendritic polymer; optionally an acrylic polyol; and a plurality of metal oxide nanoparticles optionally encapsulated in a hydroxyl functional polymer or a hydroxyl functional fluorosurfactant; and the second component includes a cross-linking agent comprising a polyisocyanate, a melamine formaldehyde resin, or a combination thereof, and wherein the surface includes glass.

Also disclosed is a refurbished component for an electronic device including a surface and a polymerization product of a first resin and a second resin, wherein the first resin includes a clear coat and a hardener, the clear coat includes a hydroxyl-functional binder comprising a polyurethane, a (meth)acrylic copolymer, a polyester, a polyether, or a combination thereof; and the hardener includes a polyisocyanate crosslinker; and wherein the second resin includes a first component and a second component, the first component includes: a hydroxyl functional dendritic polymer; optionally an acrylic polyol; and a plurality of metal oxide nanoparticles optionally encapsulated in a hydroxyl functional polymer or a hydroxyl functional fluorosurfactant; and the second component includes a cross-linking agent comprising a polyisocyanate, a melamine formaldehyde resin, or a combination thereof.

Also disclosed is a refurbished component for an electronic device including a surface and a polymerization product of a resin including a first component and a second component, wherein the first component includes: a hydroxyl functional dendritic polymer having a hydroxyl functionality of 40 to 80;a plurality of metal oxide nanoparticles optionally encapsulated in a hydroxyl functional polymer or a hydroxyl functional fluorosurfactant; and a hydroxyl-functional binder comprising a polyurethane, a (meth)acrylic copolymer, a polyester, a polyether, or a combination thereof, wherein the hydroxyl-functional binder has a hydroxyl functionality of 2 to 25;and wherein the second component includes a cross-linking agent including a polyisocyanate, a melamine formaldehyde resin, or a combination thereof.

Also disclosed is a refurbished electronic device, the electronic device including the refurbished component for the electronic device.

DETAILED DESCRIPTION

The invention now will be described more fully hereinafter. This invention may be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"Alkoxy" means an alkyl group that is linked via an oxygen (i.e., —O-alkyl). Nonlimiting examples of C1 to C30 alkoxy groups include methoxy groups, ethoxy groups, propoxy groups, isobutyloxy groups, sec-butyloxy groups, pentyloxy groups, iso-amyloxy groups, and hexyloxy groups.

"Alkyl" means a straight or branched chain saturated aliphatic hydrocarbon having the specified number of carbon atoms, specifically 1 to 12 carbon atoms, more specifically 1 to 6 carbon atoms.

"Aryl," means a cyclic moiety in which all ring members are carbon and at least one ring is aromatic, the moiety having the specified number of carbon atoms, specifically 6 to 24 carbon atoms, more specifically 6 to 12 carbon atoms. More than one ring may be present, and any additional rings may be independently aromatic, saturated or partially unsaturated, and may be fused, pendant, spirocyclic or a combination thereof.

"Halogen" means one of the elements of Group 17 of the periodic table (e.g., fluorine, chlorine, bromine, iodine, and astatine).

"Carboxyl" means a functional group consisting of a carbonyl and a hydroxyl, which has the formula —C(=O)OH.

"NCO functionality" means the average number of isocyanate groups on a molecule.

"Hydroxyl functionality" means the average number of hydroxyl groups on a molecule.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

There is currently no technology, including buffing, which can remove deep scratches on the glass surfaces of device screens or digitizers. Further, buffing does not result in a cosmetically satisfactory product having a sufficiently scratch-free appearance and suitable luster. Also, modern wireless devices use high hardness glasses and/or coatings which make buffing difficult. In addition, clear coatings do not suitably adhere directly to device screens or digitizers, making it impractical to simply cover scratched surfaces with a clear coating.

After exploring different process and material variables, it has been surprisingly discovered that the scratched, worn and lackluster glass surfaces of device screens or digitizers can be refurbished conveniently in a cost-effective matter to provide a scratch-free and shiny new appearance using the method disclosed herein. In addition, the refurbished surface can have high scratch resistance, high chemical resistance, long-term weather resistance, and excellent gloss retention. Accordingly, by refurbishing electronic devices using the discovered method, the worn devices can have a cosmetically appealing new look, and also have a surface coating that is effective to provide long term protection to the device surface, thereby preserving the environment, conserving materials, minimizing pollution, and eliminating waste.

Disclosed is a method of refurbishing a surface of a component of an electronic device, e.g., a surface of a wireless device screen or a digitizer, which provides a surface that is free of scratches or defects to the untrained and unaided eye, e.g., an eye of a consumer. The method comprises abrading a surface to be refurbished with an abrasive to remove a coating on the surface and provide an abraded surface; contacting the abraded surface with a coating resin; and curing the coating resin to provide a coated surface to refurbish the surface of the component of the electronic device.

The method may further optionally comprise, after the abrading, optionally firstly cleaning the abraded surface by contacting with a glass cleaner to provide a firstly cleaned surface; optionally secondly cleaning the firstly cleaned surface by contacting the firstly cleaned surface with a grease remover to provide a secondly cleaned surface; and optionally contacting the secondly cleaned surface with an activator to provide an activated surface.

The abrading may comprise abrading with a diamond polishing compound. The diamond polishing compound comprises diamond and a lubricant and/or a vehicle. The diamond may have a mesh of about 600 to about 2000 grit, specifically about 800 to about 1800 grit. A diamond polishing compound comprising 1200 grit diamond is specifically mentioned. In an embodiment the diamond has a maximum particle size of about 1 micrometer (µm) to about 15 µm, specifically about 2 µm to about 10 µm. Diamond having a maximum particle size of about 9 µm is specifically mentioned.

The abrading may comprise abrading with aluminum oxide particles having a size of 5 to 80 micrometers, for example, about 5 to about 30 micrometers, about 15 to about 45 micrometers, or about 30 to about 80 micrometers using an abrasive jet machining ("AJM") system. The AJM system can operate at a pressure of about 0.5 bar to about 100 bar, specifically about 1 bar to 30 bar, more specifically about 3 bar to about 10 bar. The aluminum oxide particles are carried by air or an inert gas such as nitrogen and argon. An exemplary AJM system that may be used is a Microblaster, available from Finishing Associates of Warminster, Pa.

The abrading may be sufficient to remove a coating on the surface to be refurbished. In an embodiment, the surface is an oleophilic surface. In another embodiment, the surface is an oleophobic surface. As used herein, "removing a coating" includes the situation where a coating is at least partially removed. While not wanting to be bound by theory, it is understood that complete removal of the coating is desirable in some embodiments in order to provide a refurbished surface having suitable cosmetic properties, for example, a surface which is optically scratch free and has desirable luster.

After the abrading, the abraded surface may be optionally contacted with a glass cleaner to provide a firstly cleaned surface. The glass cleaner may comprise a solvent, a cleaning agent, a surfactant, a wetting agent, or a combination thereof. The glass cleaner may also comprise a fragrance or a dye. In a specific embodiment, the glass cleaner comprises water and acetic acid. In another embodiment, the glass cleaner comprises ammonium hydroxide instead of acetic acid. The glass cleaner can also comprise disodium cocoamphodipropionate, 2-hexoxyethanol, butoxypropanol, butoxyethanol, isopropyl alcohol, propylene glycol, sodium lauryl sulfate, ethoxylated alcohol, sodium $C_{14-17}$ sec-alkyl sulfonate, sodium laureth sulfate, lauryl glucoside, alkyl polyglycoside, sodium dodecylbenzene sulfonate, ethanol amine, or a combination thereof.

Also, the abraded surface may be further optionally contacted with a grease remover to provide a secondly cleaned surface. The grease remover may comprise a solvent effective to remove grease. Exemplary solvents include acetone, an alcohol (e.g., methanol, ethanol, butanol); water; liquid carbon dioxide; an aldehyde (e.g., an acetaldehyde, a propionaldehyde), a formamide (e.g., N,N-dimethylformamide); a ketone (e.g., acetone, methyl ethyl ketone, β-bromoethyl isopropyl ketone); acetonitrile; a sulfoxide (e.g., dimethylsulfoxide, diphenylsulfoxide, ethyl phenyl sulfoxide); a sulfone (e.g., diethyl sulfone, phenyl 7-quinolylsulfone); a thiophene (e.g., thiophene 1-oxide); an acetate (e.g., ethylene glycol diacetate, n-hexyl acetate, 2-ethylhexyl acetate); an amide (e.g., propanamide, benzamide), or a combination thereof. In an embodiment, the grease remover comprises stoddard solvent such as mineral spirits, aliphatic petroleum distillates, white spirits; naphtha; heptane; toluene; or a combination thereof.

The abraded surface, which may optionally be firstly cleaned and/or secondly cleaned, may be optionally contacted with an activator to provide an activated surface. While not wanting to be bound by theory, it is understood that the activator chemically reacts with the abraded surface to provide a functional group thereon to provide improved bonding properties with a coating layer. The activator may comprise an alcohol, e.g., methanol, ethanol, propanol, isopropanol, butanol, or a combination thereof, and/or a silane compound. In an embodiment, the activator comprises a carboxysilyl compound of the formula $SiR_1R_2R_3R_4$ wherein $R_1$ is a straight or branched chain substituted with a carboxyl group or a salt thereof, each $R_2$, $R_3$ and $R_4$ is independently a C1 to C12 alkoxy group, a C1 to C12 alkyl group, a C6 to C24 aryl group, halogen, or hydroxy. The phrase "straight or branched chain" as used herein means a C1 to C12 hydrocarbon optionally substituted with a heteroatom such as N on its backbone. An exemplary carboxysilyl compound is N-[(3-trimethoxysilyl)propyl]ethylene-diamine triacetic acid trisodium salt. The activator may comprise an activator as disclosed in U.S. Pat. No. 8,293,322,the content of which in its entirety is herein incorporated by reference, e.g., 2-oxo-N-(3-(triethoxysilyl)propyl)azepane-1-carboxamide. The activator may comprise a silica sol comprising a metal salt and a partial hydrolyzate of an alkoxysilane oligomer, wherein the metal salt is a metal organic acid salt or a metal carbonate of one or more of magnesium, calcium, strontium and barium, and wherein the alkoxysilane oligomer is tetraethoxysilane, tetrapropoxysilane, methyltriethoxysilane, dimethylmethoxysilane, phenyltriethoxysilane, chlorotrimethylsilane, vinyltriethoxysilane or aminopropyltriethoxysilane. Such activators are disclosed in European Patent Application EP1304399,the content of which in its entirety is herein incorporated by reference. In an embodiment, the activator may comprise an unsaturated-hydrocarbylamido-alkanesulfonic acid or a salt thereof, e.g., 2-acrylamido-2-methylpropanesulfonic acid or a salt thereof, as disclosed in European Patent EP 1560858, the content of which in its entirety is herein incorporated by reference. The activator may comprise an epoxysilane for example a gamma glycidoxy-propyl-trimethoxy-silane.

In an embodiment, the activator may also comprise a reaction product of an epoxy silane and an amino silane having at least two amine groups per molecule. The epoxy silane and the amino silane are used in amounts such that the final mole ratio of epoxy silane to amino silane in the reaction mixture is about at least 2:1.Suitable epoxy silanes for use in preparing a reaction product with epoxy silane and amino silane include any compound containing at least one epoxy group and silane group per compound and include, for example, gamma-glycidoxypropyldimethylethoxy silane, gamma-glycidoxypropylmethyldiethoxy silane, gamma-glycidoxypropyltrimethoxy silane, glycidoxypropyltrimethoxy silane, beta-(3, 4-epoxycyclohexyl)ethylmethyltrimethoxy silane, beta-(3,4-epoxycyclohexyl)ethylmethyldimethoxy silane. Specifically mentioned is gamma-glycidoxypropyltrimethoxy silane. Suitable amino silanes include N-(beta-aminoethyl)aminomethyltrimethoxy silane, gamma-aminopropyltriethoxy silane, gamma-aminopropylmethyldiethoxy silane, N-(gamma-aminoethyl)-gamma-aminopropyltriethoxy silane, N-(gamma-aminoethyl)-gamma-methyldimethoxy silane, and trimethoxysilylpropyldiethylene triamine. N-beta-(aminoethyl)-gamma-aminopropyltrimethoxy silane is specifically mentioned. The activator may also comprise a film forming resin. Such activators are disclosed in U.S. Pat. No. 5,466,727,the content of which in its entirety is herein incorporated by reference.

The activator may be disposed by any suitable method, e.g., spraying, dipping, roll coating, brush coating, or transfer coating.

A coating resin, i.e., a coating composition comprising a resin or a clear coat, is then disposed on the abraded and optionally activated surface of the component. A wide variety of clear-coat formulations are known and can be used. However, particularly advantageous coating resins comprise a first resin and a second resin that co-cure to provide a coating with exceptional properties, for example fast cure for efficient manufacture, and suitable buffability and hardness.

Thus, in an embodiment, the coating resin comprises a first resin and a second resin. The first and second resin may each independently comprise a blend of a polymer, copolymer, terpolymer, or a combination comprising at least one of the foregoing polymers. The polymer, copolymer, terpolymer, or a combination can be an oligomer, a homopolymer, a copolymer, a block copolymer, an alternating block copolymer, a random polymer, a random copolymer, a random block copolymer, a graft copolymer, a star block copolymer, a dendrimer, or the like, or a combination thereof.

Examples of polymers which may be included in the first and/or the second resin include thermoplastic and thermosetting polymers such as polyacetals, polyolefins, polyacrylics, polyacrylates, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polyethylene terephthalate, polybutylene terephthalate, polyurethane, ethylene propylene diene rubber (EPR), polytetrafluoroethylene, fluorinated ethylene propylene, perfluoroalkoxyethylene, polychlorotrifluoroethylene, polyvinylidene fluoride, or the like, or a combination thereof.

The first and second resins may be a blend comprising thermoplastic polymers, and may include acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, nylon/elastomers, polyester/elastomers, polyethylene terephthalate/polybutylene terephthalate, acetal/elastomer, styrene-maleicanhydride/acrylonitrile-butadiene-styrene, polyether etherketone/polyethersulfone, polyether etherketone/polyetherimide polyethylene/nylon, polyethylene/polyacetal, or the like, or a combination thereof.

In an embodiment, the first and second resin may each independently comprise a polyacetal, polyacrylic, polycarbonate, polystyrene, polyester, polyamide, polyamideimide, polyarylate, polyarylsulfone, polyethersulfone, polyphenylene sulfide, polyvinyl chloride, polysulfone, polyimide, polyetherimide, polytetrafluoroethylene, polyetherketone, polyether etherketone, polyether ketone ketone, polybenzoxazole, polyoxadiazole, polybenzothiazinophenothiazine, polybenzothiazole, polypyrazinoquinoxaline, polypyromellitimide, polyquinoxaline, polybenzimidazole, polyoxindole, polyoxoisoindoline, polydioxoisoindoline, polytriazine, polypyridazine, polypiperazine, polypyridine, polypiperidine, polytriazole, polypyrazole, polypyrrolidine, polycarborane, polyoxabicyclononane, polydibenzofuran, polyphthalide, polyacetal, polyanhydride, polyvinyl ether, polyvinyl thioether, polyvinyl alcohol, polyvinyl ketone, polyvinyl halide, polyvinyl nitrile, polyvinyl ester, polysulfonate, polysulfide, polythioester, polysulfone, polysulfonamide, polyurea, polyphosphazene, polysilazane, or a combination thereof.

The first and second resins are curable resins, for example polyacrylics, polyacrylates, epoxies, phenolics, and polyurethane precursors, in particular polyurethane prepolymers. Such resins are often used in combination with hardeners, for example polyisocyanate or polyurethane prepolymers containing isocyanate groups. The prepolymers can then be reacted with monomers, oligomers, or polymers containing active hydrogen groups, for example hydroxyl and amino groups. These oligomers or polymers can be polyesters, polyacrylics, or polyacrylates. Curing agents can further be included, for example short-chain diamines and glycols such 1,4-butanediol. If needed, catalysts can be included to promote the reaction between the isocyanate groups and the hydroxyl or amino groups.

In an embodiment, the first resin comprises a clear coat, a hardener, and optionally a reducer. A content of the clear coat may be about 0.1 to about 6 parts, specifically about 1 part to about 4 parts, based on a total content of the first resin. A content of the hardener may be about 0.1 to about 2 parts, specifically about 0.2 part to about 1.5 parts, based on a total content of the first resin. The reducer, when present, acts to adjust the working viscosity of the composition. A content of the reducer may be about 0.0 to about 1 part, specifically about 0.01 part to about 0.5 part, based on a total content of the clear coat, the hardener, and the reducer, if present.

The clear coat comprises a hydroxyl-functional binder. The hydroxy-functional binders are oligomeric and/or polymeric compounds with a number average molecular weight (Mn) of, e.g., 500 to 500,000 g/mole, specifically of 1100 to 300,000 g/mole and can have a hydroxyl functionality of 2 to 25.The binders with hydroxyl groups are for example the polyurethanes, (meth)acrylic copolymers, polyesters and polyethers, or a combination thereof. Examples of hydroxy-functional polyurethane resins are those, for example, with a number average molecular weight Mn of 500 to 500 000 g/mol, specifically, of 1100 to 300 000 g/mol, more specifically, of 5000 to 300 000 g/mol, an acid value of 0 to 100 mg KOH/g, specifically of 0 to 80 mg KOH/g, a hydroxyl value of 40 to 400 mg KOH/g, specifically, of 80 to 250 mg KOH/g. The polyurethane resins include such resins which are in modified form, for example, as silicon-modified or (meth) acrylated polyurethane resins. Examples of poly(meth)acrylate resins are for example those with a number average molecular mass Mn of 1000-20000 g/mol, specifically, of 1100-15000, an acid value of 0-100 mg KOH/g, specifically, of 0-50 and a hydroxyl value of 40-400 mg KOH/g, specifically, of 60-200 mg KOH/g. The poly(meth)acrylate resins can also have been prepared in the presence of different binders, e.g., in the presence of oligomeric or polymeric polyester and/or polyurethane resins. Examples of hydroxy-functional polyester resins are for example hydroxyfunctional polyesters with a number average molecular weight of 500-10,000 g/mol, specifically, of 1100-8000 g/mol, an acid value of 0-150 mg KOH/g, specifically, of 0-50 mg KOH/g and a hydroxyl value of 40-400 mg KOH/g, specifically, of 50-200 g/mol.

The hardener of the first resin comprises a crosslinker. The crosslinkers are polyisocyanates with free isocyanate groups as cross-linking agents. Examples of polyisocyanates are any number of organic polyisocyanates with aliphatically, cycloaliphatically, araliphatically and/or aromatically bound free isocyanate groups. At 23° C., the polyisocyanates generally have a viscosity of 1 to 6,000 megapascal ("mPas"), advantageously, above 5 and below 3,000 mPas. Specifically mentioned polyisocyanates are polyisocyanates or polyisocyanate mixtures with exclusively aliphatically and/or cycloaliphatically bound isocyanate groups with an average NCO functionality of 1.5 to 5, specifically 2 to 4. Examples of particularly suitable polyisocyanates are what are known as "paint polyisocyanates" based on hexamethylene diisocyanate (HDI), 1-isocyanato-3,3,5-trimethyl-5-isocyanatomethyl-cyclohexane (IPDI), isophorone diisocyanate, 3-isocyanatomethyl-3,5,5-trimethylcyclohexyl isocyanate, and/or bis(isocyanatocyclohexyl)-methane and the derivatives thereof. As used herein, the term "derivatives thereof" with respect to the foregoing isocyanates means isocyanates and polyisocyanates modified by introduction of at least one of urethane, allophanate, urea, biuret, carbodiimide, uretonimine, or isocyanurate residues to the above mentioned diisocyanate, which, following production, are freed from surplus parent diisocyanate, for example by distillation, and having a residue content of less than 0.5% by weight. Triisocyanates, such as, triisocyanatononan can also be used. Sterically hindered polyisocyanates are also suitable. Examples of these are 1,1,6,6-tetramethyl-hexamethylene diisocyanate, 1,5-dibutyl-penta-methyldiisocyanate, p- or m-tetramethylxylylene diisocyanate and the appropriate hydrated homologues. In some embodiments, diisocyanates can be converted by the usual method to higher functional compounds, for example, by trimerization or by reaction with water or polyols, such as, for example, trimethylolpropane or glycerine. The polyisocyanates can also be used in the form of isocyanate-modified resins.

The reducer can comprise a paint solvent. Examples of suitable solvents include mono- or polyvalent alcohols, for example propanol, butanol, hexanol; glycol ethers or glycol esters, for example diethylene glycol dialkyl ether, dipropylene glycol dialkyl ether, each with C1 to C6 alkyl, ethoxy propanol, butyl glycol; glycols, for example ethylene glycol, propylene glycol, N-methylpyrrolidone and ketones, for example methyl ethyl ketone, acetone, cyclohexanon; aromatic or aliphatic hydrocarbons, for example toluene, xylene or linear or branched aliphatic C6-C12 hydrocarbons. In a specific embodiment, the reducer comprises butyl acetate, propylene glycol monoethyl ether acetate, propylene glycol methyl ether acetate, 2-methoxy-1-methylethyl acetate, 2-methoxypropyl-1-acetate, acetone, xylene, toluene, or a combination thereof.

The first resin can also comprise a low molecular reactive component, so-called reactive thinners, which are able to react with the crosslinker.

The first resin may also contain an additive. Examples of additives include light stabilizers, for example based on benztriazoles and hindered amine light stabilizer ("HALS") compounds, flow agents based on (meth)acryl-homopolymers or silicone oils, rheology-influencing agents, such as highly dispersed silica or polymeric urea compounds, thickeners, such as cross linked-on polycarboxylic acid or polyurethanes, antifoaming agents, wetting agents, curing accelerators, for example for the crosslinking reaction of OH-functional binders with the polyisocyanate crosslinkers, for example organic metallic salts, such as dibutyl tin dilaurate, zinc naphthenate and compounds containing tertiary amino groups, such as triethylamine. The selection and the quantity of the additive can be determined by a person of ordinary skill in the art without undue experimentation.

The second resin can comprise a first component and a second component. The first component comprises a hydroxyl functional dendritic polymer; optionally, an acrylic polyol; and a plurality of metal oxide nanoparticles optionally encapsulated in a hydroxyl functional polymer and/or a hydroxyl functional fluorosurfactant. The first component can comprise a catalyst and a first solvent in which the materials of the first component other than the solvent are either dissolved or dispersed. The first component can optionally comprise a sterically hindered amine light stabilizer; and optionally, a UV absorber. The second component comprises a cross-linking agent, and a second solvent which may be the same as or different from the first solvent.

The dendritic polymer is a dendritic polyester having a hydroxyl functionality of from about 40 to about 80. The molecular weight of the dendritic polyester can be from about 5,000 10,000. A highly-branched polyester having a hydroxyl functionality of 64 is specifically mentioned.

In some embodiments, the first component of the second resin can also comprise an acrylic polyol having a hydroxyl functionality of from 2 to 6. Addition of the acrylic polyol tends to reduce the hardness and brittleness of the coating composition.

Examples of the nanoparticles include, without limitation, aluminum oxide ($Al_2O_3$) and/or zinc oxide (ZnO) nanoparticles. Aluminum oxide nanoparticles can have a particle size in the range of about 10 to about 500 nanometers, specifically about 20 to about 60 nanometers. Similarly, the zinc oxide nanoparticles can have a particle size in the range of about 10 to about 500 nm, specifically from about 50 to about 70 nanometers.

Advantageously, the aluminum and zinc nanoparticles are encapsulated in a polymer. The polymer advantageously exhibits high adhesion to the nanoparticle and can be a hydroxyl functional silicone polyacrylate such as, without limitation, BYK SILCLEAN 3700*. The encapsulated aluminum oxide and/or zinc oxide nanoparticles increase scratch resistance, improve hydrophobicity, and enhance the self-cleaning surface properties of the coating.

In an embodiment, the first component of the second resin also contains a hydroxyl functional fluorocarbon, in particular a hydroxyl functional fluorinated methacrylate polymer such as, without limitation, ZONYL 8857A* fluorosurfactant from DuPont.

Optionally, a hindered amine light stabilizer (HALS) can be included in the first component of the second resin. HALS are known to those skilled in the art as efficient stabilizers against light-induced degradation of polymers. A presently preferred HALS is TINUVIN 292*.

A UV absorber can also optionally be included in the first component of the second resin, an example, without limitation, of which is hydroxyphenylbenzotriazole, commercially available as TINUVIN 1130*.

The second component of the second resin comprises a cross-linking agent polyisocyanate, which can react with hydroxyl groups to form urethanes. Another cross-linking agent that may be used is a melamine formaldehyde resin, which can react with hydroxyl groups to form acetals.

The polyisocyanate cross-linking agent having an average isocyanate functionality of from 1.5 to 5. It can be the same or different from the crosslinker in the hardener of the first resin described herein. A specifically mentioned polyisocyanate is DESMODUR N-3300*. A dibutyltin catalyst can be used to speed the cure time.

A content of each of the first component and the second component of the second resin may independently be about 0.5 to about 1.5 parts, specifically about 0.7 to about 1.4 parts, based a total content of the first component and the second component.

The second resin is disclosed in U.S. Pat. No. 8,206,827, the content of which in its entirety is herein incorporated by reference.

It has been found that a coating using the first resin alone would not provide suitable hardness, and a coating using the second resin alone would not provide suitable buffing properties. Surprisingly, when the coating resin comprises both the first resin and the second resin, the surface of a component for an electronic device can be properly a suitably refurbished to provide scratch free cosmetically-appealing appearance.

The coating resin may comprise the first resin in an amount of about 1 to about 99 wt %, specifically about 10 to about 90 wt %, more specifically about 20 to about 80 wt %, based on a total weight of the coating resin. The coating resin may comprise the second resin in an amount of about 1 to about 99 wt %, specifically about 10 to about 90 wt %, more specifically about 20 to about 80 wt %, based on a total weight of the coating resin. An embodiment comprising equal parts of the first and second resin is specifically mentioned.

The coating resin is described herein in detail as comprising a first resin and a second resin, wherein the first resin comprises a clear coat, a hardener, and optionally a reducer, and the second resin comprises a first component and a second component. However, it is appreciated that it is also within the scope of the disclosure a coating resin which comprises a first component and a second component, wherein the first component of the coating resin comprises (i) the clear coat of the first resin or the hydroxyl-functional binder of the clear coating in the first resin; and (ii) the first component of the second resin; and wherein the second component of the coating resin comprises the hardener of the first component and/or the second component of the second resin.

The coating resin can be disposed on the abraded and optionally activated surface by any suitable means, for example, by spraying, brushing, dipping, or brushing, the details of which can be determined by one of skill in the art without undue experimentation. Once deposited, the coating resin can be cured to provide a coated surface to refurbish the surface of the electronic device.

The curing may include heating the coating resin. The heating may include convection heating, microwave heating, or infra-red heating. The heating may comprise heating at about 30° C. to about 80° C., specifically at about 35° C. to about 70° C.

Depending on the curing conditions and the specific formulation of the coating resin, the curing time varies from a few minutes to a few hours. Specifically, the curing time is 5 to 180 minutes.

The surface to be refurbished can comprise glass or other materials suitable for use in the surface of electronic device components. Advantageously, the surface to be refurbished comprises glass. In an embodiment, the surface comprises an alkali aluminosilicate. Corning Gorilla glass is specifically mentioned.

Also disclosed is a method of refurbishing a digitizer for an electronic device, the method comprising the foregoing method for refurbishing a surface.

Also disclosed is a refurbished component for an electronic device, the refurbished component comprising: a polymerization product of a first resin and a second resin, wherein the first resin comprises a clear coat and a hardener, the clear coat comprises a hydroxyl-functional binder comprising a polyurethane, a (meth)acrylic copolymer, a polyester, a polyether, or a combination thereof; and the hardener comprises a polyisocyanate crosslinker; and wherein the second resin comprises a first component and a second component, the first component comprises: a hydroxyl functional dendritic polymer; optionally an acrylic polyol; and a plurality of metal oxide nanoparticles optionally encapsulated in a hydroxyl functional polymer or a hydroxyl functional fluorosurfactant; and the second component comprises a cross-linking agent comprising a polyisocyanate, a melamine formaldehyde resin, or a combination thereof.

In an embodiment, the polymerization product is directly disposed on the surface of the component for an electronic device. In another embodiment, the refurbished component may further comprise an activation layer disposed between the polymerization product and the component surface of the electronic device. The electronic device may be a wireless device. The component may be a screen, a digitizer, a front case, or a rear case, for example.

Also disclosed is refurbished electronic device, the electronic device comprising a component comprising: a substrate; and a polymerization product of a first resin and a second resin directly on the substrate, wherein the first resin and the second resin are as disclosed herein.

The disclosed embodiment is further described by way of the following Examples. The Examples are illustrative and shall not limit the scope of this disclosure.

EXAMPLES

Example 1

A digitizer of an Apple iPhone was provided. The surface of the digitizer was abraded using a 1200 mesh diamond polishing compound (Rio Grande* 201494). The abraded digitizer was then firstly cleaned using a glass cleaner (Windex*), secondly cleaned using a degreaser (Klean Strip* Prep-All*), and dry wiped to remove residual degreaser.

The cleaned surface was then treated with an activator (Glassprimer GP083).

The activated surface was then sprayed with a coating resin prepared by combining equal parts of a first resin and a second resin. The first resin was prepared by mixing 1 part hardener (Spies Hecker Permasolid* 3220), 0.1 part reducer (Spies Hecker Permacron* 3363), and 3 parts clearcoat (Spies Hecker Permasolid* 8600). The second resin was prepared using 1 part of a clear (Nanovere VX-RC 2K) and 1 part activator (Nanovere).

The coating resin was allowed to cure at room temperature to provide a refurbished surface.

Example 2

The surface of a digitizer was abraded, cleaned, and activated following the same procedure of Example 1.

The activated surface was then sprayed with a coating resin prepared by combining 1 part by volume of a first resin and 8 parts by volume of a second resin. The first resin was prepared by mixing 4 parts by volume of a clear coat (PPG Concept DCU 2021 clear), 1 part by volume of a hardener (PPG DCX hardner), and 1 part by volume of a reducer (PPG 870 reducer). The second resin was prepared using 1 part by volume of a clear coat (Nanovere VX-RC 2K) and 1 part by volume of an activator (Nanovere).

The coating resin was allowed to cure at room temperature to provide a refurbished surface. The refurbished surface was evaluated by contacting with a finger nail and a copper penny. No scratches were observed after contacting with the finger nail and the copper penny.

Comparative Example 1

Example 1 was repeated except that the activated surface was sprayed with a coating resin containing only the first resin. Contacting with a finger nail showed that the coating was scratched by the finger nail, and thus is too soft and susceptible to scratches.

Comparative Example 2

Example 1 was repeated except that the activated surface was sprayed with a coating resin containing only the second resin. It was observed the coating was too hard and not buffable.

Comparative Examples 3 to 6

Example 1 was repeated except that the surface of the digitizer was abraded with a Scotch Brite™ abrasive pad, 200A sand paper, a grease bar, and a $Na_2CO_3$ blast, respectively instead of the 1200 mesh diamond polishing compound. It was observed that the coating was uneven and did not provide cosmetically appealing appearance.

In an embodiment, a method of refurbishing a surface of a component for an electronic device, comprises: abrading a surface to be refurbished with an abrasive to remove a coating on the surface and provide an abraded surface; optionally firstly cleaning the abraded surface by contacting with a glass cleaner to provide a firstly cleaned surface; optionally secondly cleaning the firstly cleaned surface by contacting the firstly cleaned surface with a grease remover to provide a secondly cleaned surface; optionally contacting the secondly cleaned surface with an activator to provide an activated surface; and disposing a coating resin on the abraded and optionally activated surface; and curing the coating resin to provide a coated surface to refurbish the surface of the electronic device, wherein the coating resin comprises a hydroxyl functional dendritic polymer; optionally an acrylic polyol; and a plurality of metal oxide nanoparticles optionally encapsulated in a hydroxyl functional polymer or a hydroxyl functional fluorosurfactant. The coating resin can comprise a first resin and a second resin, wherein the second resin comprises a first component comprising the hydroxyl functional dendritic polymer, the optional acrylic polyol and the plurality of metal oxide nanoparticles; and the first resin comprises a clear coat and a hardener, wherein the clear coat comprises a hydroxyl-functional binder comprising a polyurethane, a (meth)acrylic copolymer, a polyester, a polyether, or a combination thereof; and the hardener comprises a polyisocyanate crosslinker.

In various embodiments, (i) the abrading comprises abrading with a diamond polishing compound; (ii) the diamond polishing compound comprises diamond having a mesh of 600 to 2000 grit; (iii) the diamond polishing compound comprises 1200 mesh diamond; (iv) the diamond polishing compound comprises diamond having a maximum particle size of 1 micrometer to 15 micrometers; (v) the diamond polishing compound comprises diamond having a maximum particle size of 1 micrometer to 10 micrometers; and/or (vi) the abrading comprises abrading with aluminum oxide having a particle size of 5 to 80 micrometers using an abrasive jet machining system.

In various embodiments, (i) the coating is an oleophilic coating; (ii) the glass cleaner comprises water and acetic acid; (iii) the grease remover comprises acetone, an alcohol; liquid carbon dioxide; an aldehyde; a formamide; a ketone; acetonitrile; a sulfoxide; a sulfone; a thiophene; an acetate; an amide; or a combination thereof; (iv) the grease remover comprises mineral spirits, aliphatic petroleum distillates, white spirits, naphtha, heptane, toluene or a combination thereof; (v) the activator comprises a silane; (vi) the activator comprises a reaction product of an epoxy silane and an amino silane having at least two amino groups; (vii) the activator comprises a carboxysilyl compound of the formula $SiR_1R_2R_3R_4$ wherein $R_1$ is a straight or branched chain substituted with a carboxyl group or a salt thereof, each $R_2$, $R_3$ and $R_4$ is independently a C1 to C12 alkoxy group, a C1 to C12 alkyl group, a C6 to C24 aryl group, halogen, or hydroxyl; (viii) the activator comprises N-[(3-trimethoxysilyl)propyl]ethylene-diamine triacetic acid trisodium salt; (ix) the activator comprises 2-oxo-N-(3-(triethoxysilyl)propyl) azepane-1-carboxamide; (x) the activator comprises a silica sol comprising a metal salt and a partial hydrolyzate of an alkoxysilane oligomer, wherein the metal salt is a metal organic acid salt or a metal carbonate of one or more of magnesium, calcium, strontium and barium, and wherein the alkoxysilane oligomer is tetraethoxysilane, tetrapropoxysilane, methyltriethoxysilane, dimethylmethoxysilane, phenyltriethoxysilane, chlorotrimethylsilane, vinyltriethoxysilane or aminopropyltriethoxysilane; (xi) the activator comprises an unsaturated-hydrocarbylamido-alkanesulfonic acid or a salt thereof; and/or (xii) the contacting comprises spraying, dipping, roll coating, brush coating, or transfer coating.

In another embodiment, a refurbished component for an electronic device comprises a surface, and a polymerization product of a first resin and a second resin disposed on the surface, wherein the first resin comprises a clear coat and a hardener, the clear coat comprises a hydroxyl-functional binder comprising a polyurethane, a (meth)acrylic copolymer, a polyester, a polyether, or a combination thereof; and the hardener comprises a polyisocyanate crosslinker; and wherein the second resin comprises a first component and a second component, the first component comprises: a hydroxyl functional dendritic polymer; optionally an acrylic polyol; and a plurality of metal oxide nanoparticles optionally encapsulated in a hydroxyl functional polymer or a hydroxyl functional fluorosurfactant; and the second component comprises a cross-linking agent comprising a polyisocyanate, a melamine formaldehyde resin, or a combination thereof.

In yet another embodiment, a refurbished component for an electronic device comprises a surface and a polymerization product of a resin having a first component and a second component disposed on the surface, wherein the first component comprises: a hydroxyl functional dendritic polymer having a hydroxyl functionality of 40 to 80;a plurality of metal oxide nanoparticles optionally encapsulated in a hydroxyl functional polymer or a hydroxyl functional fluorosurfactant; and a hydroxyl-functional binder comprising a polyurethane, a (meth)acrylic copolymer, a polyester, a polyether, or a combination thereof, wherein the hydroxyl-functional binder has a hydroxyl functionality of 2 to 25;and wherein the second component comprises a cross-linking agent comprising a polyisocyanate, a melamine formaldehyde resin, or a combination thereof.

In various embodiments, (i) the hydroxyl functional dendritic polymer has a hydroxyl functionality of 40 to 80;(ii) the hydroxyl functional dendritic polymer is a branched polyester having a hydroxyl functionality of 64;(iii) the acrylic polyol has a hydroxyl functionality of 2 to 6;(iv) the plurality of encapsulated metal oxide nanoparticles comprises encapsulated aluminum oxide nanoparticles, encapsulated zinc oxide nanoparticles or a combination thereof; (iv) the hydroxyl functional polymer is a hydroxyl functional silicone polyacrylate; (v) the hydroxyl functional fluorosurfactant is a hydroxyl functional fluorinated methacrylate polymer; (vi) the hydroxyl-functional binder has an acid value of 0 to 100 mg KOH/g, and a hydroxyl value of 40 to 400 mg KOH/g; (vii) the polyisocyanate crosslinker has an average NCO functionality of 1.5 to 5;(viii) the polyisocyanate crosslinker comprises hexamethylene diisocyanate, isophorone diisocyanate, 3-isocyanatomethyl-3,5,5-trimethylcyclohexyl isocyanate, 1-isocyanato-3,3,5-trimethyl-5-isocyanatomethyl-cyclohexane, bis(isocyanatocyclohexyl)-methane, a derivative of one of the foregoing, or a combination thereof; (ix) the first resin further comprises a reducer comprising butyl acetate, propylene glycol monoethyl ether acetate, propylene glycol methyl ether acetate, 2-methoxy-1-methylethyl acetate, 2-methoxypropyl-1-acetate, acetone, xylene, toluene, a combination comprising at least one of the foregoing; (x) the polymerization product is disposed directly on the surface; (xi) the refurbished component further comprises an activation layer disposed between the surface and the polymerization product; (xii) the electronic device is a wireless device; and/or (xiii) the component is a screen, a digitizer, a front case, or a rear case.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of refurbishing a surface of a component for an electronic device, the method comprising:
   abrading a surface to be refurbished with an abrasive to remove a coating on the surface and provide an abraded surface;
   optionally firstly cleaning the abraded surface by contacting with a glass cleaner to provide a firstly cleaned surface;
   optionally secondly cleaning the firstly cleaned surface by contacting the firstly cleaned surface with a grease remover to provide a secondly cleaned surface;
   optionally contacting the secondly cleaned surface with an activator to provide an activated surface; and
   disposing a coating resin on the abraded and optionally activated surface; and
   curing the coating resin to provide a coated surface to refurbish the surface of the electronic device,
   wherein the coating resin comprises a first resin and a second resin,
   the first resin comprises a clear coat and a hardener;
      wherein the clear coat comprises a hydroxyl-functional binder comprising a polyurethane, a (meth)acrylic acid copolymer, or a combination thereof; the polyurethane having a number average molecular weight Mn of 500 to 500,000 g/mol, an acid value of 0 to 100 mg KOH/g, and a hydroxyl value of 40 to 400 mg KOH/g; the (meth)acrylic acid copolymer has a number average molecular mass Mn of 1000 to 20,000 g/mol, an acid value of 0 to 100 mg KOH/g, and a hydroxyl value of 40 to 400 mg KOH/g; and
      the hardener comprises a polyisocyanate crosslinker; and
   the second resin comprises a first component comprising
      a hydroxyl functional dendritic polymer;
      optionally an acrylic polyol; and
      a plurality of metal oxide nanoparticles optionally encapsulated in a hydroxyl functional polymer or a hydroxyl functional fluorosurfactant.

2. The method of claim 1, wherein the abrading comprises abrading with a diamond polishing compound.

3. The method of claim 2, wherein the diamond polishing compound comprises diamond having a mesh of 600 to 2000 grit.

4. The method of claim 1, wherein the abrading comprises abrading with aluminum oxide having a particle size of 5 to 80 micrometers by abrasive jet machining.

5. The method of claim 1, wherein the activator comprises a silane.

6. The method of claim 1, wherein the polyurethane comprises a silicon-modified or a (meth)acrylate-modified polyurethane resin.

7. The method of claim 1, wherein the polyisocyanate crosslinker has an average NCO functionality of 1.5 to 5.

8. The method of claim 7, wherein the polyisocyanate crosslinker comprises hexamethylene diisocyanate, isophorone diisocyanate, 3-isocyanatomethyl-3,5,5-trimethylcyclohexyl isocyanate, 1-isocyanato-3,3,5-trimethyl-5-isocyanatomethyl-cyclohexane, bis(isocyanatocyclohexyl)-methane, a derivative of one of the foregoing, or a combination thereof.

9. The method of claim 1, wherein the first resin further comprises a reducer, the reducer comprising butyl acetate, propylene glycol monoethyl ether acetate, propylene glycol methyl ether acetate, 2-methoxy-1-methylethyl acetate, 2-methoxypropyl-1-acetate, acetone, xylene, toluene, a combination comprising at least one of the foregoing.

10. The method of claim 1, wherein the second resin further comprises a second component, wherein the second component comprises a cross-linking agent comprising polyisocyanate, a melamine formaldehyde resin, or a combination thereof.

11. The method of claim 1, wherein the hydroxyl functional dendritic polymer is a branched polyester having a hydroxyl functionality of 40 to 80.

12. The method of claim 1, wherein the acrylic polyol has a hydroxyl functionality of 2 to 6.

13. The method of claim 1, wherein the plurality of encapsulated metal oxide nanoparticles comprises encapsulated aluminum oxide nanoparticles, encapsulated zinc oxide nanoparticles, or a combination thereof.

14. The method of claim 1, wherein the hydroxyl functional polymer is a hydroxyl functional silicone polyacrylate.

15. The method of claim 1, wherein the hydroxyl functional fluorosurfactant is a hydroxyl functional fluorinated methacrylate polymer.

16. A method of refurbishing a surface, the method comprising:
abrading a surface to be refurbished with an abrasive to remove a coating on the surface and provide an abraded surface;
optionally firstly cleaning the abraded surface by contacting with a glass cleaner to provide a firstly cleaned surface;
optionally secondly cleaning the firstly cleaned surface by contacting the firstly cleaned surface with a grease remover to provide a secondly cleaned surface;
optionally contacting the secondly cleaned surface with an activator to provide an activated surface; and
disposing a coating resin on the abraded and optionally activated surface; and
curing the coating resin to provide a coated surface to refurbish the surface,
wherein the coating resin comprises a first resin and a second resin,
the first resin comprises a clear coat and a hardener;
wherein the clear coat comprises a hydroxyl-functional binder comprising a polyurethane, a (meth)acrylic acid copolymer, or a combination thereof; the polyurethane having a number average molecular weight Mn of 500 to 500,000 g/mol, an acid value of 0 to 100 mg KOH/g, and a hydroxyl value of 40 to 400 mg KOH/g; the (meth)acrylic acid copolymer has a number average molecular mass Mn of 1000 to 20,000 g/mol, an acid value of 0 to 100 mg KOH/g, and a hydroxyl value of 40 to 400 mg KOH/g; and
the hardener comprises a polyisocyanate crosslinker; and
the second resin comprises a first component comprising
a hydroxyl functional dendritic polymer;
optionally an acrylic polyol; and
a plurality of metal oxide nanoparticles optionally encapsulated in a hydroxyl functional polymer or a hydroxyl functional fluorosurfactant.

17. A refurbished component for an electronic device comprising a surface and a polymerization product of a resin comprising a first component and a second component disposed on the surface,
wherein the first component comprises:
a hydroxyl functional dendritic polymer having a hydroxyl functionality of 40 to 80;
a plurality of metal oxide nanoparticles optionally encapsulated in a hydroxyl functional polymer or a hydroxyl functional fluorosurfactant; and
a hydroxyl-functional binder comprising a polyurethane, a (meth)acrylic copolymer, or a combination thereof, wherein the hydroxyl-functional binder has a hydroxyl functionality of 2 to 25; the polyurethane having a number average molecular weight Mn of 500 to 500,000 g/mol, an acid value of 0 to 100 mg KOH/g, and a hydroxyl value of 40 to 400 mg KOH/g; the (meth)acrylic acid copolymer has a number average molecular mass Mn of 1000 to 20,000 g/mol, an acid value of 0 to 100 mg KOH/g, and a hydroxyl value of 40 to 400 mg KOH/g; and
wherein the second component comprises a cross-linking agent comprising a polyisocyanate, a melamine formaldehyde resin, or a combination thereof.

18. A method of refurbishing a surface of a component for an electronic device, the method comprising:
abrading a surface to be refurbished with an abrasive to remove a coating on the surface and provide an abraded surface;
optionally firstly cleaning the abraded surface by contacting with a glass cleaner to provide a firstly cleaned surface;
optionally secondly cleaning the firstly cleaned surface by contacting the firstly cleaned surface with a grease remover to provide a secondly cleaned surface;
contacting the secondly cleaned surface with an activator to provide an activated surface; and
disposing a coating resin on the abraded and activated surface; and
curing the coating resin to provide a coated surface to refurbish the surface of the electronic device,
wherein the coating resin comprises a first resin and a second resin,
the first resin comprises a clear coat, hardener, and a reducer,
wherein the clear coat comprises a hydroxyl-functional binder comprising a polyurethane, a (meth)acrylic acid copolymer, or a combination thereof; the polyurethane having a number average molecular weight Mn of 500 to 500,000 g/mol, an acid value of 0 to 100 mg KOH/g, and a hydroxyl value of 40 to 400 mg KOH/g; the (meth)acrylic acid copolymer has a number average molecular mass Mn of 1000 to 20,000 g/mol, an acid value of 0 to 100 mg KOH/g, and a hydroxyl value of 40 to 400 mg KOH/g; and
the hardener comprises a polyisocyanate crosslinker; and
the reducer comprises a solvent; and
the second resin comprises a first component and a second component,
wherein the first component comprises:
a hydroxyl functional dendritic polymer;
optionally an acrylic polyol; and
a plurality of metal oxide nanoparticles optionally encapsulated in a hydroxyl functional polymer or a hydroxyl functional fluorosurfactant; and
the second component comprises a cross-linking agent comprising a polyisocyanate, a melamine formaldehyde resin, or a combination thereof, and
wherein the surface comprises glass.

* * * * *